United States Patent
Noh et al.

(10) Patent No.: US 10,096,871 B2
(45) Date of Patent: Oct. 9, 2018

(54) BATTERY PACK

(71) Applicant: SAMSUNG SDI CO., LTD., Yongin-si, Gyeonggi-do (KR)

(72) Inventors: Kyounghwan Noh, Yongin-si (KR); Jongseop Kwak, Yongin-si (KR); Shangchul Seok, Yongin-si (KR); Sanggyu Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 70 days.

(21) Appl. No.: 15/007,933

(22) Filed: Jan. 27, 2016

(65) Prior Publication Data

US 2016/0226117 A1   Aug. 4, 2016

(30) Foreign Application Priority Data

Jan. 30, 2015 (KR) .................. 10-2015-0015548

(51) Int. Cl.
| | |
|---|---|
| *H01M 10/6566* | (2014.01) |
| *H01M 10/613* | (2014.01) |
| *H01M 10/6563* | (2014.01) |
| *H01M 2/10* | (2006.01) |
| *H01M 2/20* | (2006.01) |

(52) U.S. Cl.
CPC ..... *H01M 10/6566* (2015.04); *H01M 2/1077* (2013.01); *H01M 2/206* (2013.01); *H01M 10/613* (2015.04); *H01M 10/6563* (2015.04)

(58) Field of Classification Search
None
See application file for complete search history.

(56) References Cited

U.S. PATENT DOCUMENTS

| | | | |
|---|---|---|---|
| 2010/0173189 A1* | 7/2010 | Suzuki | H01M 2/1077 429/158 |
| 2011/0151314 A1* | 6/2011 | Ogawa | H01M 2/1077 429/158 |
| 2012/0121959 A1* | 5/2012 | Yamada | B60K 1/04 429/100 |
| 2012/0328928 A1* | 12/2012 | Oh | H01M 10/6566 429/120 |
| 2014/0322568 A1 | 10/2014 | Sakai et al. | |

FOREIGN PATENT DOCUMENTS

| | | |
|---|---|---|
| JP | 2007-018752 A | 1/2007 |
| JP | 2012-104225 A | 5/2012 |
| JP | 5312710 B1 | 10/2013 |

* cited by examiner

*Primary Examiner* — Wojciech Haske
(74) *Attorney, Agent, or Firm* — Lee & Morse P.C.

(57) ABSTRACT

A battery pack including a plurality of battery cells aligned in a first column, a second column, and a third column; a bypass member, the bypass member including supporting surfaces that support the plurality of battery cells in the first and second columns, and forming a bypass flow path that bypasses the battery cells in the first and second columns; and compensation members, the compensation members including supporting surfaces that support the plurality of battery cells in the third column, wherein the supporting surfaces of the compensation members are substantially coplanar with the supporting surfaces of the bypass member.

13 Claims, 7 Drawing Sheets

BATTERY PACK

CROSS-REFERENCE TO RELATED APPLICATION

Korean Patent Application No. 10-2015-0015548, filed on Jan. 30, 2015, in the Korean Intellectual Property Office, and entitled: "Battery Pack," is incorporated by reference herein in its entirety.

BACKGROUND

1. Field

Embodiments relate to a battery pack.

2. Description of the Related Art

Secondary batteries are rechargeable, unlike primary batteries that cannot be recharged. The secondary batteries may be used as energy sources in mobile devices, electric vehicles, hybrid vehicles, electric bicycles, uninterruptible power supplies, etc., and may be of a single-battery type or a pack type in which multiple batteries are electrically connected to each other and bound in one unit, according to types of external devices using the secondary batteries.

SUMMARY

Embodiments are directed to a battery pack.

The embodiments may be realized by providing a battery pack including a plurality of battery cells aligned in a first column, a second column, and a third column; a bypass member, the bypass member including supporting surfaces that support the plurality of battery cells in the first and second columns, and forming a bypass flow path that bypasses the battery cells in the first and second columns; and compensation members, the compensation members including supporting surfaces that support the plurality of battery cells in the third column, wherein the supporting surfaces of the compensation members are substantially coplanar with the supporting surfaces of the bypass member.

The battery pack may further include a cooling fan to generate air flow toward the plurality of battery cells, wherein the plurality of battery cells in the first to third columns are sequentially aligned further from a location of the cooling fan.

The bypass member may be under the plurality of battery cells in the first and second columns, and the compensation members may be under the plurality of battery cells in the third column.

The bypass flow path may be under the plurality of battery cells in the first and second columns.

The bypass member and the compensation members may each include gap protrusions, the gap protrusions may protrude upwardly from the supporting surfaces of the respective bypass member and compensation members, the gap protrusions may space the battery cells apart such that gap flow paths are provided among the plurality of battery cells.

The battery pack may further include cases housing the plurality of battery cells, wherein the bypass member and the compensation members are on bottom portions of the cases.

The bypass flow path may be between the bottom portions of the cases and the bypass member.

The bypass member may include a base plate that extends across the plurality of battery cells in the first and second columns and is spaced apart from the bottom portions of the cases; and a supporter protruding from the base plate to the bottom portions of the cases and providing the bypass flow path between the base plate and the bottom portions of the cases.

A sloped surface may be between the bypass member and the compensation members, the sloped surface guiding a flow of air from the bypass flow path to upper portions of the compensation members.

The battery pack may further include cases housing the plurality of battery cells, wherein the bypass member and the compensation members are on bottom portions of the cases, and the slope extends to one side of compensation member from the bottom portions of the cases.

The battery pack may further include first and second cases coupled in facing directions, wherein the plurality of battery cells are interposed between the first and second cases; and spacers between the first and second cases, the spacers spacing the battery cells apart such that flow paths are provided among the plurality of battery cells.

The spacers may include a plurality of openings therein, and the plurality of battery cells may be inserted into the plurality of openings.

The spacers may be between neighboring battery cells in a same column and between battery cells in neighboring columns.

The second case may include bus bars integrally formed therewith, the bus bars extending across upper portions of neighboring battery cells and electrically connecting the neighboring battery cells.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
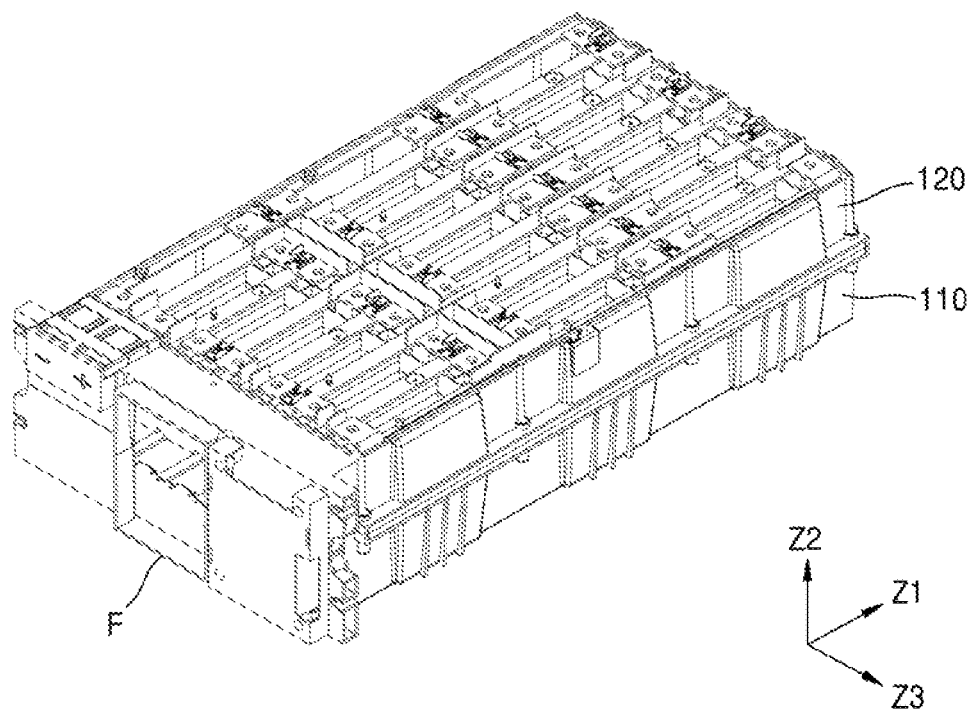
FIG. 1 illustrates a battery pack according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
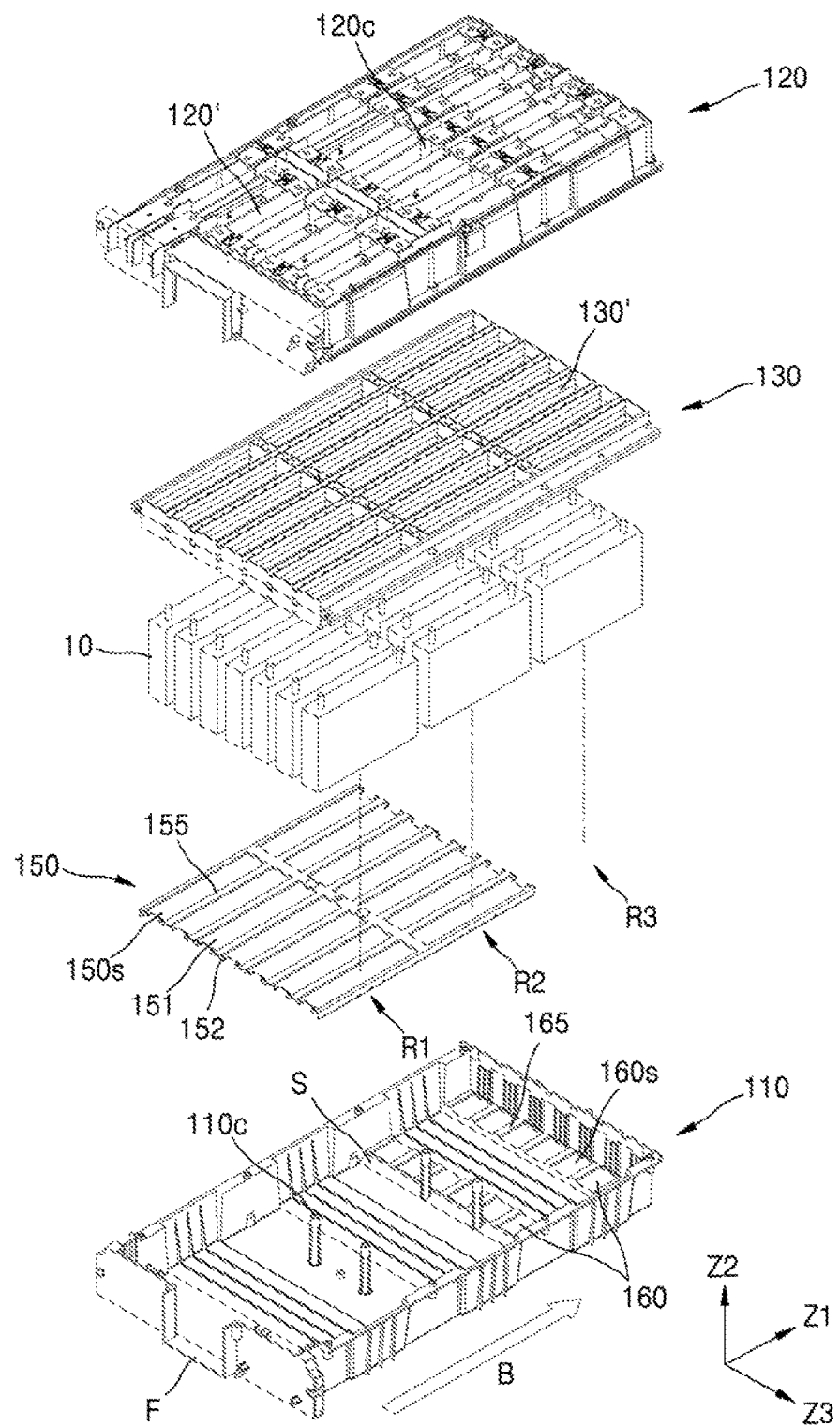
FIG. 2 illustrates an exploded perspective view of the battery pack of FIG. 1.

FIG. 1 illustrates a battery pack according to an exemplary embodiment. FIG. 2 illustrates an exploded perspective view of the battery pack of FIG. 1. Referring to FIGS. 1 and 2, the battery pack may include a plurality of battery cells 10 and cases 110 and 120 housing the battery cells 10. For convenience of illustration, the battery cells 10 are not shown in FIG. 1.

Referring to FIG. 2, the battery cells 10 may be aligned in three columns R1, R2, and R3. For example, the battery cells 10 may be aligned in a first column R1, a second column R2, and a third column R3. As described below, based on a location F of a cooling fan, the battery cells 10 may be aligned in the first column R1 (that is closest to the location F of the cooling fan), in the third column R3 (that is farthest from the location F of the cooling fan), and in the second column R2 (between the first and third columns R1 and R3). As described below, in order to facilitate cooling of the battery cells 10 aligned in the third column R3 (that is farthest from the location F of the cooling fan), a bypass flow path B bypassing the battery cells 10 in the first and second columns R1 and R2 may be formed or provided.

A cooling agent or medium (e.g., air) may be forcibly injected through the location F of the cooling fan, may pass through or among the battery cells 10 aligned in the first and second columns R1 and R2, and may cool the battery cells 10. For example, the air flowing through or from the location F of the cooling fan may sequentially pass through or among the battery cells 10 aligned in the first column R1 and the battery cells 10 aligned in the second column R2, and may exchange heat with the battery cells 10 aligned in the first and second columns R1 and R2. The battery cells 10 aligned in the third column R3 (that is farthest from the location F of the cooling fan) may be cooled by air provided from the location F of the cooling fan to the battery cells 10 aligned in the third column R3 via the bypass flow path B.

The battery pack according to an exemplary embodiment may include the bypass flow path B. For example, supporting surfaces 150s may support the first and second columns R1 and R2 of battery cells 10, and the bypass flow path B may bypass the battery cells 10 aligned in the first and second columns R1 and R2. The battery pack may include compensation members 160 including supporting surfaces 160s supporting the battery cells 10 aligned in the third column R3. Heights of the supporting surfaces 160s (e.g., from a bottom end of the battery pack) may be the same as heights of the supporting surfaces 150s (e.g., from the bottom end of the battery pack).

A bypass member 150 may be formed or provided under the battery cells 10 that are aligned in the first and second columns R1 and R2. The compensation members 160 may be formed or provided under the battery cells 10 aligned in the third column R3. The bypass flow path B may be formed under the battery cells 10 aligned in the first and second columns R1 and R2. Detailed descriptions regarding the bypass member 150 and the compensation members 160 will be provided below.

The battery cells 10 may be housed in the cases 110 and 120. The cases 110 and 120 may include first and second cases 110 and 120 that are coupled to face each other with the battery cells 10 therebetween. The first and second cases 110 and 120 may be coupled to each other in upward and downward directions with the battery cells 10 therebetween. For example, the first case 110 may form a bottom portion of the case, and the second case 120 may form a top portion of the case.

Figure 3:
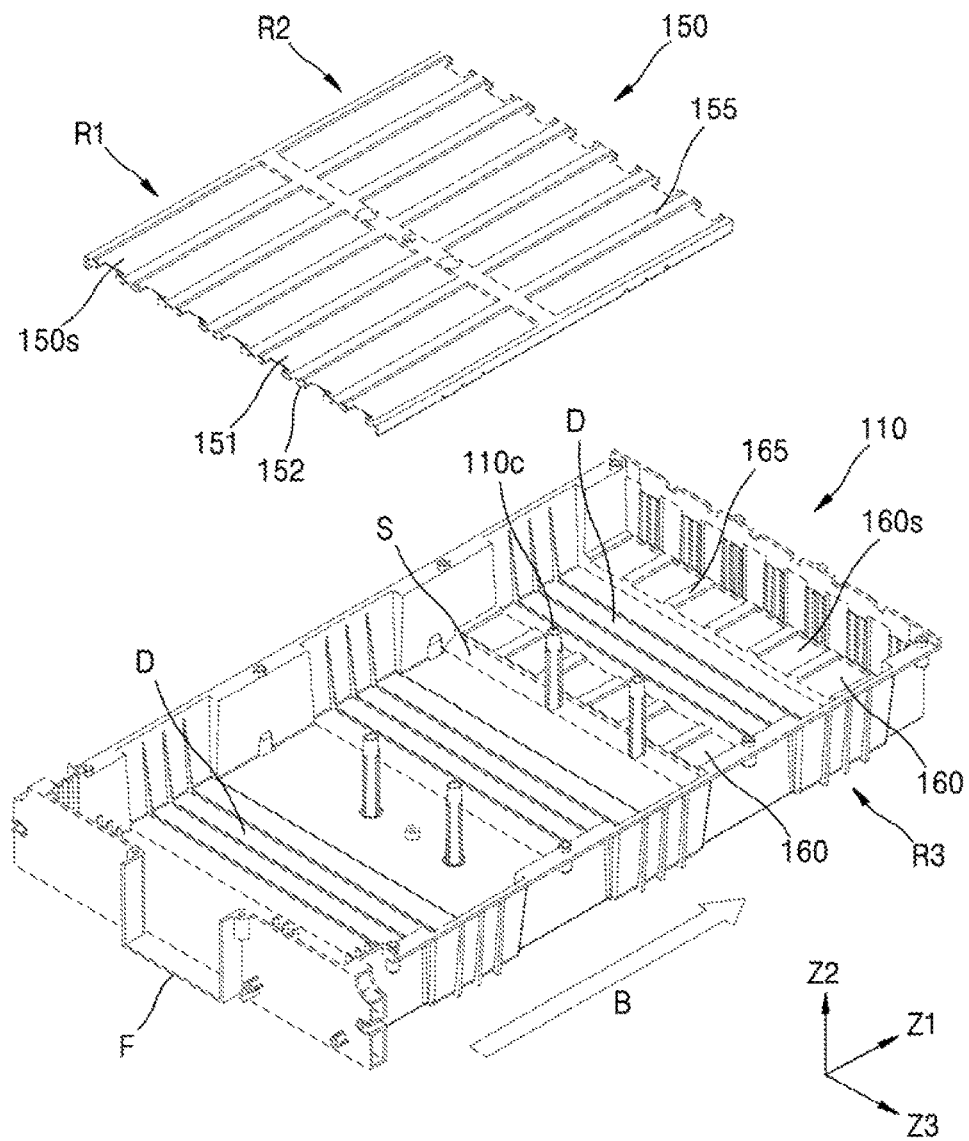
FIGS. 3 and 4 illustrate perspective views of a bypass member and compensation members and respectively show the bypass member before and after assembly.
Figure 4:
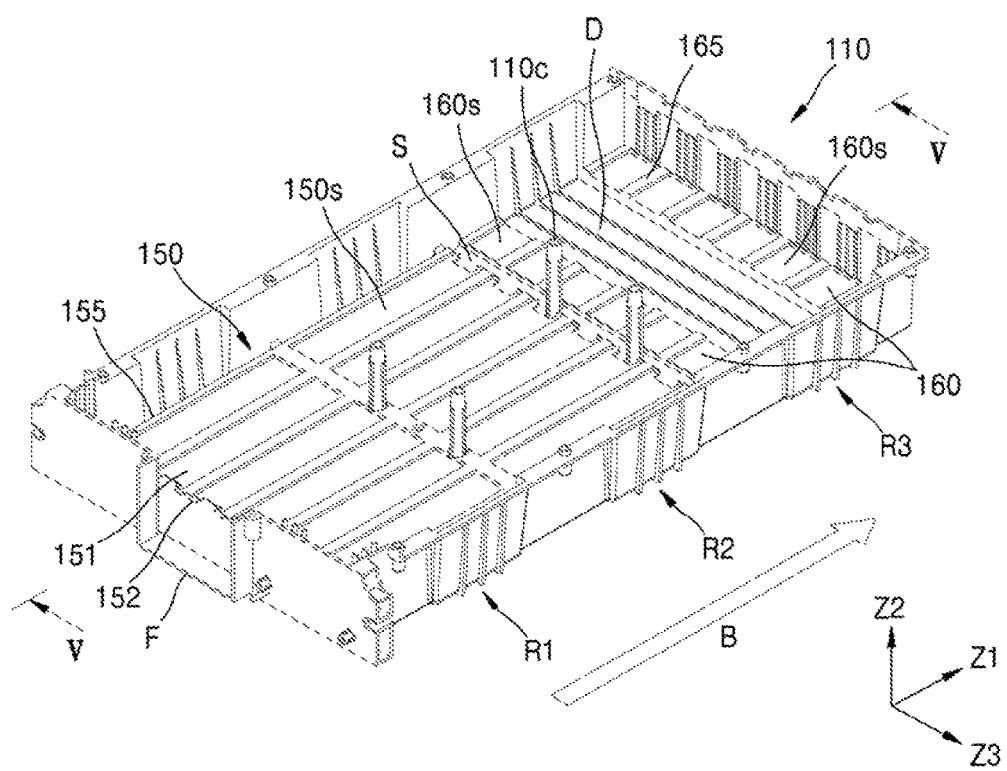
Figure 5:
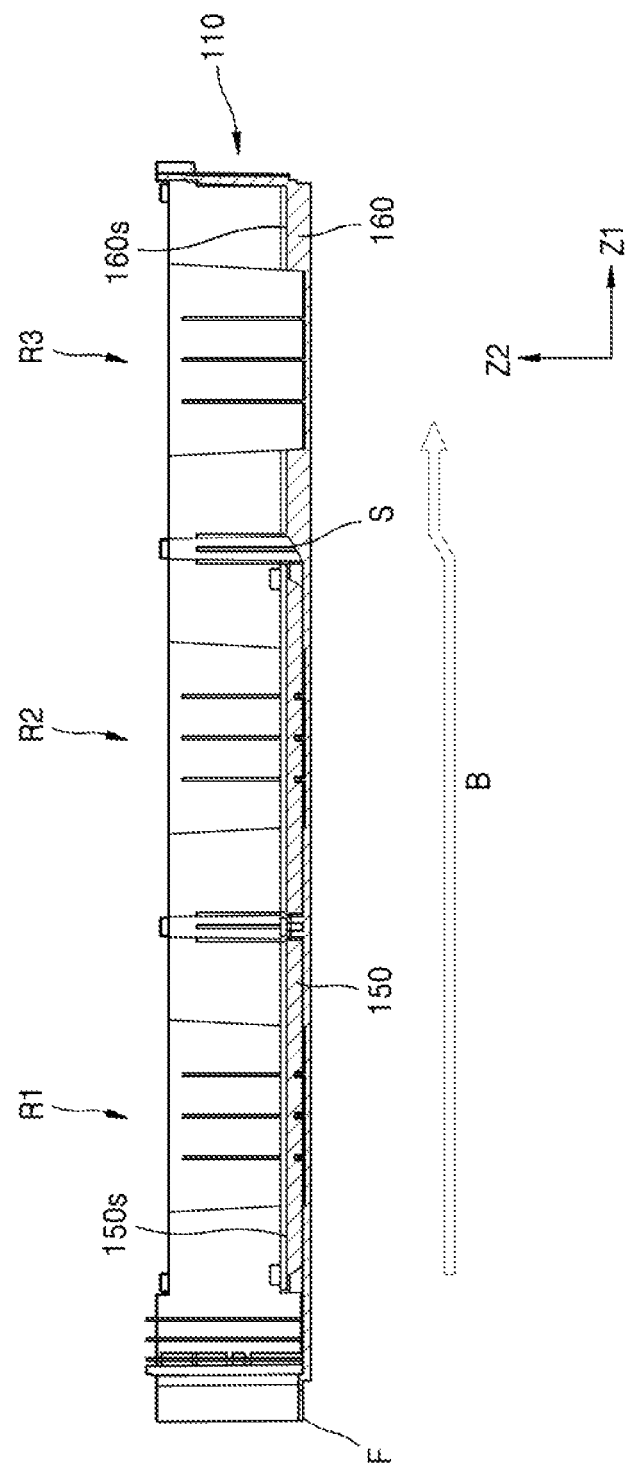
FIG. 5 illustrates a cross-sectional view taken along a line V-V of FIG. 4.
Figure 6:
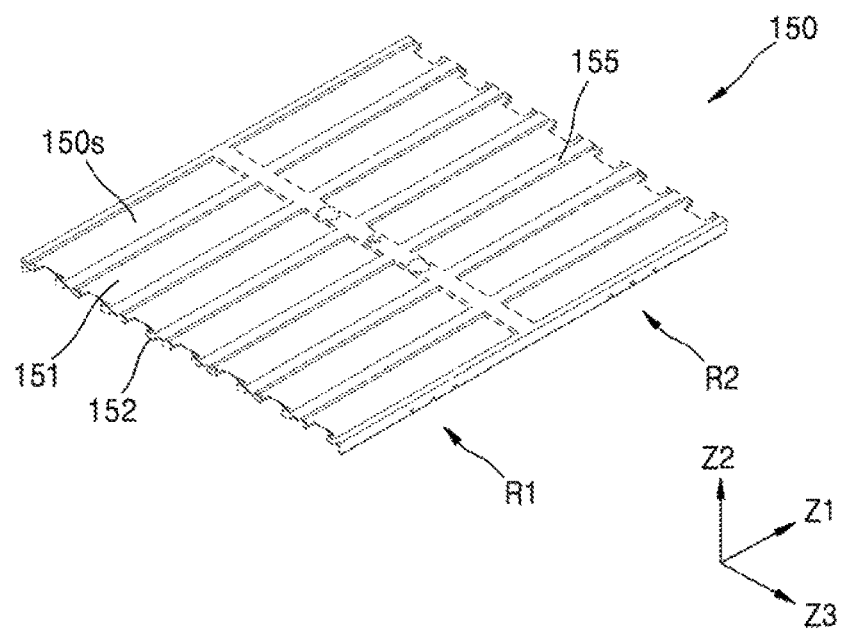
FIGS. 6 and 7 illustrate perspective views of upper and bottom portions of a bypass member.
Figure 7:
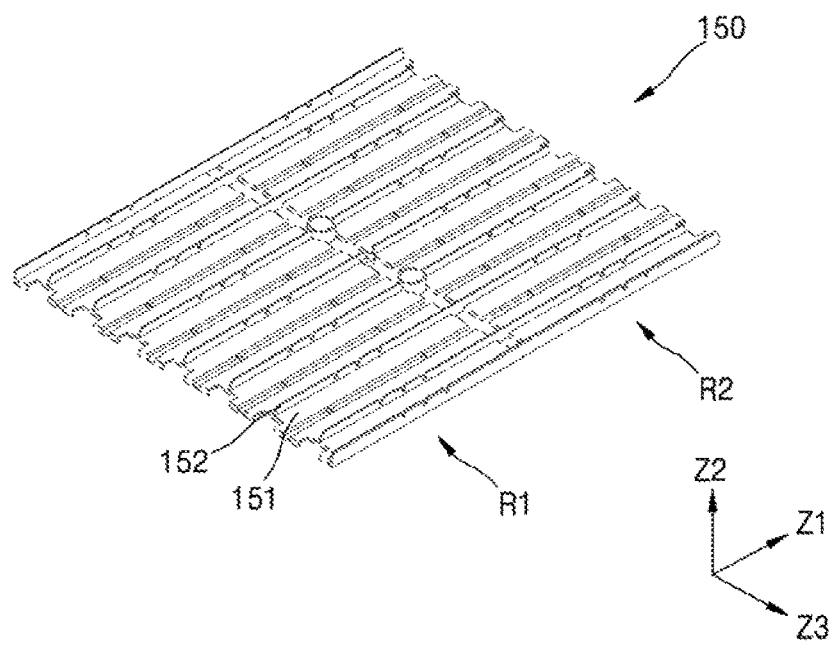

FIGS. 3 and 4 illustrate views of the bypass member 150 and the compensation members 160 and respectively show the bypass member 150 before and after assembly. FIG. 5 illustrates a cross-sectional view taken along a line V-V of FIG. 4. FIGS. 6 and 7 illustrate perspective views of top and bottom sides of the bypass member 150.

Referring to FIGS. 3 and 4, the bypass member 150 may be formed or provided on a bottom portion of the first case 110 in order to form the bypass flow path B. The bypass member 150 may provide the bypass flow path B that extends across or under the battery cells 10 aligned in the first and second columns R1 and R2 and bypasses the battery cells 10 aligned in the first and second columns R1 and R2. For example, bypassing the battery cells 10 aligned in the first and second columns R1 and R2 means that a flow path from the location F of the cooling fan to the battery cells 10 aligned in the third column R3 is provided without passing among the battery cells 10 aligned in the first and second columns R1 and R2.

In an implementation, the bypass flow path B may extend across or under the bottom portions of the battery cells 10 aligned in the first and second columns R1 and R2, and may extend toward the battery cells 10 aligned in the third column R3 without passing (e.g., without being in a heat-exchanging or thermal relationship with) the bottom portions of the battery cells 10 aligned in the first and second columns R1 and R2.

Through the bypass flow path B, air flow that does not pass (e.g., that has not exchanged heat with) the battery cells 10 aligned in the first and second columns R1 and R2 may be provided to the battery cells 10 aligned in the third column R3. For example, heat dissipation efficiency of the battery cells 10 aligned in the third column R3 at a relatively long distance or distal to the source of the cooling medium may be improved. For example, a deviation of the heat dissipation efficiency according to distances from the location F of the cooling fan may be removed and/or compensated for, and heat may be equally dissipated from the battery cells 10 aligned in the first to third columns R1 to R3. Thus, heat concentration of or at some battery cells 10 may be prevented, peak values of temperatures may be reduced, and abnormal situations (e.g., deterioration or explosion of some battery cells 10) may be reduced and/or prevented.

The bypass flow path B may be defined as a gap between the bottom portion of the first case 110 and (e.g., an inner, bottom facing surface of) the bypass member 150. The bypass member 150 may provide or form the bypass flow path B by providing or forming a predetermined gap from the bottom portion of the first case 110. Referring to FIG. 6, the bypass member 150 may include base plates 151 (having the predetermined gap (e.g., being spaced a predetermined distance) from the bottom portion of the first case 110) and supporters 152 (that protrude, e.g., by the predetermined distance) toward the bottom portion of the first case 110 from the base plates 151 and that support or secure the a gap between the bottom portion of the first case 110 and the base plates 151, e.g., may space the base plates 151 apart from the bottom portion of the first case 110 by the predetermined distance).

The base plates 151 may be of a plate type (e.g., may be plate-shaped) and may cover or underlie the battery cells 10 aligned in the first and second columns R1 and R2. The gap between the bottom of the first case 110 and the base plates 151 may correspond to the bypass flow path B.

The supporters 152 may support the base plates 151 from the bottom of the first case 110 and may secure a predetermined gap from the bottom of the first case 110. As shown in FIG. 7, the supporters 152 may be in a stripe pattern and may cross or underlie the base plates 151. An extension direction of the supporters 152 may be parallel to a direction of air flow such that air passing through the bypass flow path B is not disturbed. For example, the supporters 152 may be arranged to be parallel to a direction in which air flows from the location F of the cooling fan. For example, the supporters 152 may be arranged to be parallel to a shortest direction from the location F of the cooling fan to the location of the third column R3.

Referring to FIGS. 3 and 4, the bypass member 150 may provide the bypass flow path B that extends toward the battery cells 10 aligned in the third column R3, and may also buffer the battery cells 10 aligned in the first and second columns R1 and R2. For example, the bypass member 150 may elastically support the battery cells 10 aligned in the first and second columns R1 and R2. For example, the bypass member 150 may elastically support the battery cells 10 aligned in the first and second columns R1 and R2 (while having the predetermined gap from the bottom of the first case 110) and may absorb impact that may otherwise be applied to the battery cells 10 aligned in the first and second columns R1 and R2. For example, the battery cells 10 aligned in the first and second columns R1 and R2 may not directly receive impact delivered from the bottom of the first case 110, and may be buffered by the bypass member 150, thereby helping to reduce and/or prevent damage that may be caused by external impact.

The bypass member 150 may include the supporting surfaces 150s with respect to or for the battery cells 10 aligned in the first and second columns R1 and R2. For example, the battery cells 10 are aligned on the bypass member 150 in the first and second columns R1 and R2 and may directly contact the supporting surfaces 150s of the bypass member 150. Gap protrusions 155 on the bypass member 150 may protrude in an upward direction from the supporting surfaces 150s and may secure or provide gap flow paths between the battery cells 10 (e.g., of the first and second columns R1 and R2). The gap protrusions 155 may secure or provide the gap flow paths between the battery cells 10 (e.g., may space the battery cells 10 of the first and second columns R1 and R2 apart from one another such that a flow bath extends between and/or among the battery cells of the first and second columns R1 and R2) and may help dissipate heat by providing a path for air that forcibly flows from the location F of the cooling fan. For example, the gap protrusions 155 may help secure or provide gaps between the battery cells 10 in order to maximize the heat dissipation efficiency. Locations of the gap protrusions 155 may correspond to the gap flow paths for cooling the battery cells 10.

As described below, assembly locations of the battery cells 10 may be defined in the first case 110 (e.g., by the gap protrusions 155) on the bottom portions of the battery cells 10 and by a spacer 130 on central portions of the battery cells 10. The assembly locations of the battery cells 10 may be defined by the second case 120 (e.g., ribs 121 and 122) on the upper portions of the battery cells 10.

In the first case 110, the compensation members 160 (for removing or compensating for a height deviation of the bypass member 150 at the first and second columns R1 and R2) may be arranged at a location corresponding with the third column R3. The compensation members 160 may make heights (e.g., from a bottom of the first case 110) of the locations of the first to third columns R1 to R3 even. As shown in FIG. 5, the compensation members 160 may include supporting surfaces 160s for the battery cells 10 aligned in the third column R3, such that the heights of the supporting surfaces 160s of the compensation members 160 may be the same as those of the supporting surfaces 150s of the bypass member 150, e.g., such that bottom surfaces of battery cells 10 (in the third column R3) on the compensation members 160 may be substantially coplanar with bottom surfaces of battery cells 10 (in the first and/or second columns R1 and R2) on the bypass member 150.

The compensation members 160 may help ensure that the battery cells 10 aligned in the first to third columns R1 to R3 are supported at substantially the same height. Thus, the battery cells 10 aligned in the first to third columns R1 to R3 may be easily connected. Detailed descriptions will be provided as follows.

The battery cells 10 aligned in the first to third columns R1 to R3 may have substantially the same structure and may have the same height in a vertical direction. As described below, the battery cells 10 aligned in the first to third columns R1 to R3 may be electrically connected to each other via bus bars 180 that extend across the upper portions of the battery cells 10 aligned in the first to third columns R1 to R3. As the battery cells 10 aligned in the first to third columns R1 to R3 are at the same height, a connection structure including the bus bars 180 may be simplified. For example, if there were to be a height deviation between the battery cells 10 aligned in the first and second columns R1 and R2 and the battery cells 10 aligned in the third column R3 due to, e.g., the bypass member 150, bus bars 180, in which the height deviation is reflected and which are exclusively used to connect the battery cells 10 aligned in the third column R3, would be required, and accordingly, structures of the bus bars 180 would undesirably differ.

The supporting surfaces 160s of the compensation members 160 and the supporting surfaces 150s of the bypass member 150 may be formed at substantially the same height, e.g., may be substantially coplanar with one another. The compensation members 160 may remove or compensate for the height deviation from the bottom of the first case 110 due to the bypass member 150. Thus, it may be advantageous that the supporting surfaces 160s of the compensation members 160 and the supporting surfaces 150s of the bypass member 150 have the same height or are substantially coplanar with one another. Having the same height means that heights of portions of upper or supporting surfaces of the compensation members 160 (which contact the battery cells 10) are the same as a height of a portion of an upper or supporting surface of the bypass member 150 (which contacts the battery cells 10). For example, the battery cells 10 aligned in the third column R3 and supported by the compensation members 160 may have the same height as the battery cells 10 aligned in the first and second columns R1 and R2 and supported by the bypass member 150.

In an implementation, the compensation members 160 may be integrally formed with the bottom of the first case 110. For example, when the bypass member 150 is formed by or as a separate component covering the bottom of the first case 110, the compensation members 160 may be integrally formed with the first case 110.

Referring to FIGS. 3 and 4, the compensation members 160 may be formed at the location of the third column R3, and pairs of the compensation members 160 may be formed on both sides of the third column R3 in order to support the battery cells 10 aligned in the third column R3 on their both sides. Additional flow paths D may be formed between the compensation members 160 (formed on the sides of the third column R3). The additional flow paths D may form spaces under the battery cells 10 in order to allow low-temperature air to approach thereto and may induce air flowing from the bottom portions to the upper portions of the battery cells 10.

The additional flow paths D may be identically formed on the locations of the first column R1 and the second column R2. Additional flow paths D of the first and second columns R1 and R2 may be formed on the bottom of the first case 110. In this case, the bypass member 150 may be formed or provided above or on the additional flow paths D, and the additional flow paths D and the bypass flow path B may be formed or provided under the bypass member 150.

The compensation members 160 may directly support the battery cells 10, and the battery cells 10 may directly contact the supporting surfaces 160s of the compensation members 160. Gap protrusions 165 (protruding in an upward direction from the supporting surfaces 160s and securing or forming gap flow paths between the battery cells 10) may be formed on the compensation members 160. For example, the compensation members 160 may include the gap protrusions 165. The gap protrusions 165 may facilitate dissipation of heat by securing the gap flow paths between the battery cells 10 (e.g., by spacing the battery cells 10 apart from one another) as the air forcibly flows from the location F of the cooling fan. For example, locations of the gap protrusions 165 may correspond to or define locations of the gap flow paths for cooling the battery cells 10. In an implementation, the gap protrusions 165 of the compensation members 160 may form the gap flow paths having substantially the same size as the gap protrusions 155 of the bypass member 150.

A slope S may be between the compensation members 160 and the bypass member 150. The slope S may guide air to smoothly flow toward the third column R3 through or from the bypass flow path B. For example, the bypass flow path B may start from the location F of the cooling fan and may extend under a bottom portion of the bypass member 150 (at the first column R1 and the second column R2). The air flowing toward the location of the third column R3 through the bypass flow path B may pass over upper portions of the compensation members 160 and may flow to the gap flow paths and, in this case, the slope S may be between the bypass member 150 and the compensation members 160 such that the air may flow from the bottom of the first case 110 to the upper portions of the compensation members 160.

In an implementation, the slope S may be on one side of the compensation members 160, e.g., one side of the compensation members 160 that is adjacent to the bypass member 150. The slope S may extend from the bottom of the first case 110 and may be connected to the side of the compensation members 160. Due to the slope S, pressure of the air and power of the cooling fan, which may be consumed with respect to the same amount of flux, may decrease.

Referring to FIG. 2, the spacer 130 may be arranged between the first and second cases 110 and 120. The spacer 130 may help secure the gap flow paths between the battery cells 10 and may include openings 130' into which the battery cells 10 may be inserted. The spacer 130 may be integrally formed, which means that the spacer 130 that is a single component may be applied to all battery cells 10 forming one battery pack. For example, the openings 130' for the battery cells 10 of one battery pack may be formed in the spacer 130 that is integrally formed. As the spacer 130 is integrally formed, there may be no need to prepare a plurality of spacers.

The spacer 130 may help secure the gap flow paths between the battery cells 10 aligned in the same columns R1, R2, and R3, and may also help secure a predetermined space between the battery cells 10 aligned in different columns R1, R2, and R3. Thus, the battery cells 10 aligned in a matrix may be spaced apart from the battery cells 10 that are vertically and horizontally adjacent to each other, thereby improving heat dissipation efficiency.

The openings 130' of the spacer 130 may be of a closed type, e.g., all surfaces of which are closed. For example, the assembly locations of the battery cells 10 in the openings 130' of the spacer 130 may be controlled in all directions and may be accurately maintained. Movement of the battery cells 10 (e.g., due to external impact) may be strictly controlled or prevented. Thus, damage caused by movement of the battery cells 10 may be reduced and/or prevented. In an implementation, swelling of the battery cells 10 in the openings 130' of the spacer 130 may be controlled in all directions. For example, the battery cells 10 could undergo swelling as electrochemical reactions occurring due to charge and discharge of the battery cells 10 are repeated. In this case, the swelling may be reduced and/or effectively prevented when the openings 130' of the spacer 130 surround an external perimeter of the battery cells 10 overall. In an implementation, the spacer 130 may be formed of an insulating material and/or may be a polymeric injection molding form in which a metallic material, e.g., steel, is inserted to provide high rigidity, which may help effectively prevent the swelling. For example, the metallic material may be partially inserted into an end of the spacer 130.

The cases 110 and 120 may include the first and second cases 110 and 120 which are coupled to face each other. For example, the first and second cases 110 and 120 may include coupling units 110c and 120c, which protrude in a vertical direction, e.g., in a direction toward one another. The coupling units 110c and 120c of the first and second cases 110 and 120 may protrude in directions in which the coupling units 110c and 120c face each other and may be inserted into each other. The first case 110 may form the bottom portion of the case, and the bypass member 150 and the compensation members 160 may be on or in the first case 110. The second case 120 may form the top portion of the case, and openings 120' for exposing the upper portions of the battery cells 10 may be in the second case 120.

Figure 8:
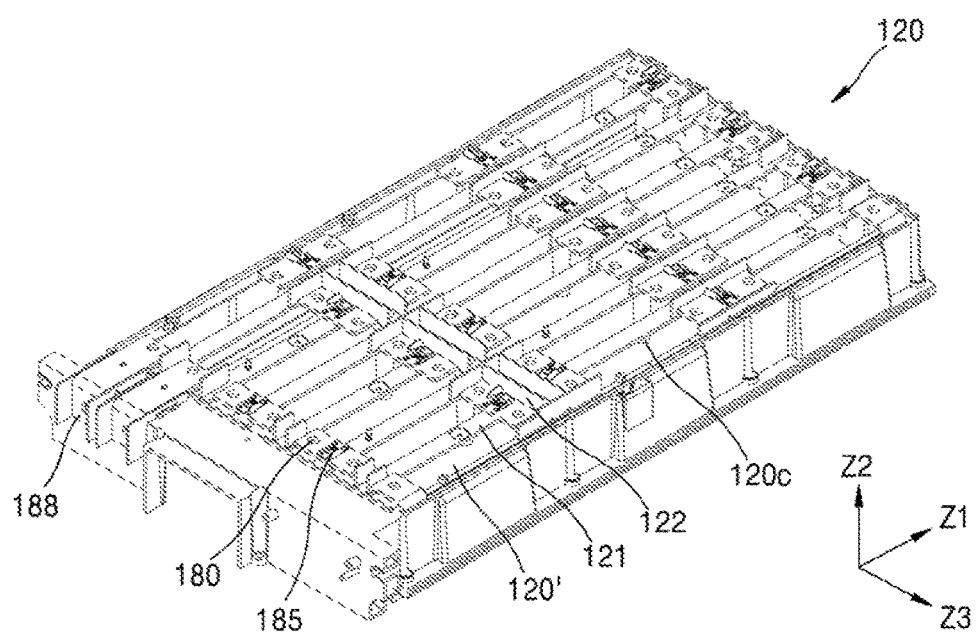
FIG. 8 illustrates a perspective view of a second case.

FIG. 8 illustrates a perspective view of the second case 120.

Referring to FIG. 8, the openings 120' of the second case 120 may be formed or defined by ribs 121 and 122 that confine or set assembly positions of the battery cells 10. The openings 120' of the second case 120 may confine the battery cells 10, which are aligned in a matrix form, in every direction, and the ribs 121 and 122 may include first and second ribs 121 and 122 that extend in two different directions.

In an implementation, bus bars 180 may be integrally formed with the second case 120. The bus bars 180 may electrically connect neighboring battery cells 10 to each other. Some of the bus bars 180 may connect the battery cells 10 aligned in the same columns (R1, R2, and R3), and other bus bars 180 may connect the battery cells 10 in different columns (R1, R2, and R3). External terminals 188 may be integrally formed with the bus bars 180 so as to form both ends of an electric connection. The second case 120 may be formed of an insulating material, and the bus bars 180 may be formed of metallic materials integrated with the second case 120 through injection molding. The bus bars 180 may electrically connect the battery cells 10 to each other by connecting electrode terminals of a pair of battery cells, which are adjacent to each other in the horizontal or vertical direction, to each other.

In an implementation, wires may be integrally formed with the second case 120 along with the bus bars 180. The wires may transmit state information such as a voltage, a current, or a temperature of each battery cell 10. The state information may be transmitted to a protection circuit module and may be used to control charging and discharging operations of the battery cells 10. For example, the wires may be electrically or thermally connected to the bus bars 180 via connectors 185 mounted on the bus bars 180 and may collect the state information such as a voltage or a temperature of a battery cell 10.

The table below shows numerical values that are output after an experiment conducted to check the heat dissipation efficiency of a battery pack to which the bypass flow path B is applied, e.g., an Example, and that of a battery pack to which the bypass flow path B is not applied, according to a Comparative Example.

TABLE

|  | Comparative Example (° C.) | Example (° C.) |
|---|---|---|
| cell 1 | 33.41 | 33.11 |
| cell 2 | 36.39 | 36.69 |
| cell 3 | 37.90 | 35.11 |
| cell 4 | 38.05 | 35.37 |
| cell 5 | 40.54 | 36.01 |
| cell 6 | 36.19 | 36.10 |
| cell 7 | 33.24 | 32.91 |
| cell 8 | 38.31 | 35.48 |
| cell 9 | 40.82 | 41.45 |
| cell 10 | 43.51 | 37.69 |
| cell 11 | 43.43 | 40.07 |
| cell 12 | 46.17 | 38.32 |
| cell 13 | 40.96 | 41.00 |
| cell 14 | 38.24 | 34.92 |
| cell 15 | 42.76 | 35.87 |
| cell 16 | 45.41 | 40.49 |
| cell 17 | 47.97 | 38.02 |
| cell 18 | 48.30 | 39.76 |
| cell 19 | 50.23 | 38.20 |
| cell 20 | 45.52 | 39.88 |
| cell 21 | 42.66 | 35.33 |
| Min | 33.24 | 32.91 |
| Max | 50.23 | 41.45 |
| Del | 16.99 | 8.53 |

The battery cells 10 may be aligned in the first to third columns R1 to R3, and seven battery cells 10 may be aligned in each column. After the same amount of operation time passes, a temperature of each battery cell 10 may be measured. In the above Table, cells 1 to 7 indicate the battery cells 10 aligned in the first column R1. Cells 8 to 14 indicate the battery cells 10 aligned in the second column R2, and cells 15 to 21 indicate the battery cells 10 aligned in the third column R3. The lowest temperature among the temperatures measured from the battery cells 10 is indicated by 'min', and the highest temperature among the temperatures measured from the battery cells 10 is indicated by 'max'. A temperature deviation between the highest temperature and the lowest temperature is indicated by 'del'.

As may be seen in the Table, the temperature deviation del of the inventive concept, in which the bypass flow path B is used, may be greatly decreased in comparison with the temperature deviation del of the Comparative Example. In the Comparative Example, according to an arrangement order of the battery cells 10 from the location F of the cooling fan, air may be sequentially provided from the first column R1 to the third column R3, and air that is heated while passing the first column R1 and the second column R2 may be provided to the third column R3. Thus, the temperature of the battery cells 10 aligned in the third column R3 may be greater than that of the battery cells 10 aligned in the first column R1 and the second column R2. For example, the heat dissipation efficiency of the battery cells 10 aligned in the third column R3 may be low, and the temperature of the battery cells 10 aligned in the third column R3 may sharply increase, compared to the battery cells 10 aligned in the first column R1 and the second column R2, even though the operation time is the same.

In an implementation, air that has a relatively low temperature and has not been heated (e.g., by passing among the battery cells 10 of the first column R1 and the second column R2) may be provided to the battery cells 10 aligned in the third column R3, and the provision of the air may not be affected by the arrangement order from the location F of the cooling fan. Thus, the battery cells 10 aligned in the third column R3 and the battery cells 10 aligned in the first column R1 and the second column R2 may be equally cooled.

As a result, according to one or more exemplary embodiments, an equivalent level of cooling efficiency may be provided with respect to the battery cells 10 aligned in the first to third columns R1 to R3. Thus, a temperature deviation "del" between the minimum temperature min and the maximum temperature max may be reduced. For example, decreasing the maximum temperature max means that a risk of abnormal operations, ignition, and explosion due to overheating may be reduced, the battery pack stably operates.

According to one exemplary embodiment, in a structure of a battery pack including multiple battery cells, a battery pack in which a deviation of heat dissipation efficiency according to locations of the battery cells may be removed and which may provide heat dissipation efficiency is provided.

According to one exemplary embodiment, a bypass flow path, which bypasses the battery cells aligned in the first and second columns and provides a flow of low-temperature air to the battery cells aligned in the third column, may be provided.

According to one exemplary embodiment, compensation members may remove and/or prevent a height deviation between the battery cells aligned in the first to third columns, wherein the height deviation could otherwise be generated according to the formation of the bypass flow path. Thus, the battery cells aligned in the first to third columns may be supported at a uniform height, and as the battery cells aligned in different columns may be supported at a uniform height, an electrical and systematic coupling structure may be simplified.

One or more exemplary embodiments include a battery pack including a plurality of battery cells. In the battery pack, a deviation of heat dissipation efficiency according to locations of the battery cells may be removed, and a heat dissipation effect may be consistently provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a plurality of battery cells aligned in a first column, a second column, and a third column;
   a bypass member, the bypass member:
   including supporting surfaces that support the plurality of battery cells in the first and second columns, and forming a bypass flow path, through which a cooling agent flows toward the battery cells in the third column with bypassing the battery cells in the first and second columns; and compensation members to guide the cooling agent from the bypass flow path toward sidewalls of the battery cells in the third column and upward of upper surfaces of the compensation members, the upper surfaces of the compensation members supporting the plurality of battery cells in the third column, wherein a height of the upper surfaces of the compensation members are substantially same as a height of the supporting surfaces of the bypass member, and wherein a sloped surface is between the bypass member and the compensation members and between the batter cells in the second column and the battery cells in the third column, the sloped surface guiding the cooling agent from the bypass flow path to upper portions of the compensation members such that the cooling agent flows with contacting the sidewalls of the battery cells in the third column.

2. The battery pack as claimed in claim 1, further comprising a cooling fan to generate a flow of the cooling agent toward the plurality of battery cells, wherein the plurality of battery cells in the first to third columns are sequentially aligned further from a location of the cooling fan.

3. The battery pack as claimed in claim 1, wherein:
the bypass member is under the plurality of battery cells in the first and second columns, and
the compensation members are under the plurality of battery cells in the third column.

4. The battery pack as claimed in claim 3, wherein the bypass flow path is under the plurality of battery cells in the first and second columns.

5. The battery pack as claimed in claim 1, wherein:
the bypass member and the compensation members each include gap protrusions,
the gap protrusions protrude upwardly from the supporting surfaces of the respective bypass member and compensation members,
the gap protrusions space the battery cells apart such that gap flow paths are provided among the plurality of battery cells.

6. The battery pack as claimed in claim 1, further comprising cases housing the plurality of battery cells, wherein the bypass member and the compensation members are on bottom portions of the cases.

7. The battery pack as claimed in claim 6, wherein the bypass flow path is between the bottom portions of the cases and the bypass member.

8. The battery pack as claimed in claim 6, wherein the bypass member includes:
a base plate that extends across the plurality of battery cells in the first and second columns and is spaced apart from the bottom portions of the cases; and
a supporter protruding from the base plate to the bottom portions of the cases and providing the bypass flow path between the base plate and the bottom portions of the cases.

9. The battery pack as claimed in claim 1, further comprising cases housing the plurality of battery cells, wherein:
the bypass member and the compensation members are on bottom portions of the cases, and
the sloped surface extends to one side of compensation member from the bottom portions of the cases.

10. The battery pack as claimed in claim 1, further comprising:
first and second cases coupled in facing directions, wherein the plurality of battery cells are interposed between the first and second cases; and
spacers between the first and second cases, the spacers spacing the battery cells apart.

11. The battery pack as claimed in claim 10, wherein:
the spacers include a plurality of openings therein, and
the plurality of battery cells are inserted into the plurality of openings.

12. The battery pack as claimed in claim 10, wherein the spacers are between neighboring battery cells in a same column and between battery cells in neighboring columns.

13. The battery pack as claimed in claim 10, wherein the second case includes bus bars integrally formed therewith, the bus bars extending across upper portions of neighboring battery cells and electrically connecting neighboring battery cells.

* * * * *